Dec. 11, 1951  A. A. GUSSA  2,577,962
SPRING MOTOR
Filed Nov. 12, 1946
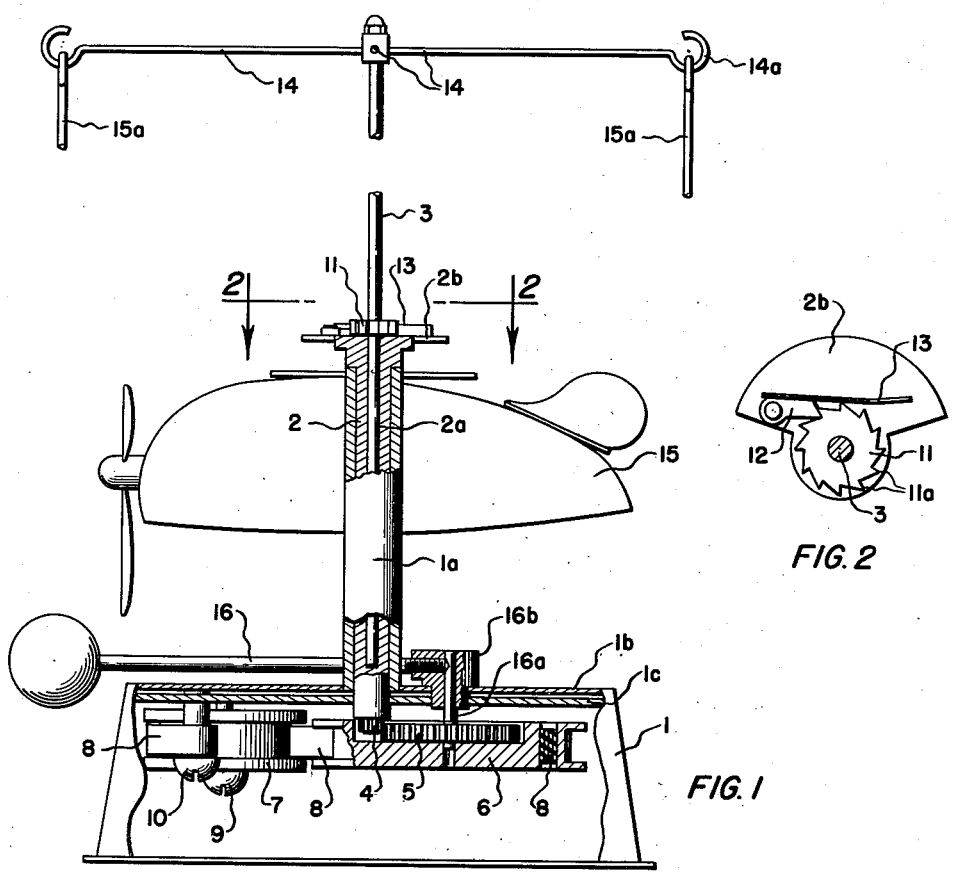
FIG. 1
FIG. 2
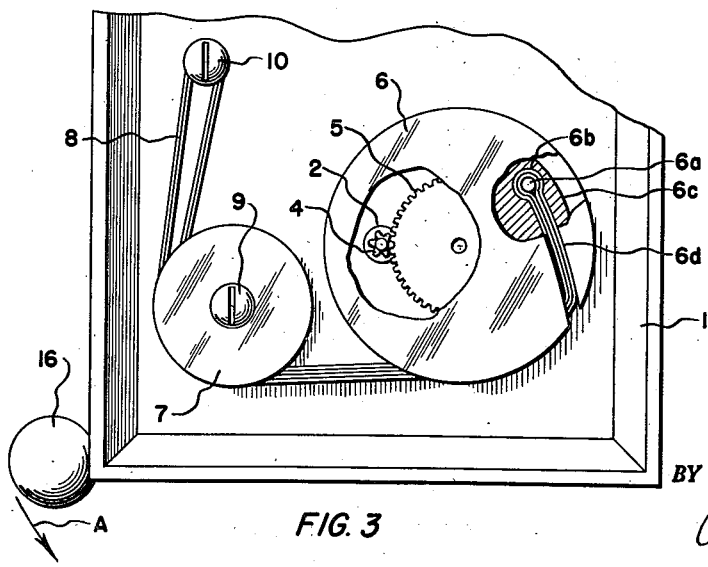
FIG. 3
INVENTOR.
ARVIN A. GUSSA
BY
A. B. Bowman
ATTORNEY Patented Dec. 11, 1951

2,577,962

UNITED STATES PATENT OFFICE 2,577,962

SPRING MOTOR

Arvin A. Gussa, San Diego, Calif.

Application November 12, 1946, Serial No. 709,367

6 Claims. (Cl. 185—37)

My invention relates to a model airplane rotating stand and the objects of my invention are:

First, to provide a rotating stand of this class having novel motivating means for operating model airplanes in connection therewith;

Second, to provide a novel mechanism for operating various mechanical toys;

Third, to provide a model airplane rotating stand of this class which may be constantly wound while in operation;

Fourth, to provide a model airplane rotating stand of this class in which the operating mechanism thereof, is very easily and simply wound by small children;

Fifth, to provide a model airplane rotating stand of this class which is very simple to maintain and repair;

Sixth, to provide a model airplane rotating stand of this class in which the actuating mechanism, thereof, may be entirely wound by one single movement of the winding lever, thereof; and Seventh, to provide a model airplane rotating stand of this class which is very simple and economical of construction, efficient in operation, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, forming a part of this application in which:

Figure 1 is a side elevational view of my model airplane rotating stand showing portions broken away and in section to amplify the illustration; Fig. 2 is an enlarged plan sectional view taken from the line 2—2 of Fig. 1; and Fig. 3 is a fragmentary bottom plan view of my model airplane rotating stand showing portion, thereof, broken away and in section to amplify the illustration.

Similar characters of reference refer to similar parts and portions throughout the several views of the drawings.

The base 1, shafts 2 and 3, gears 4 and 5, rollers 6 and 7, resilient band 8, axle 9, bolt 10, ratchet wheel 11, pawl 12, spring 13, cross arms 14, airplane 15 and operating handle 16 constitute the principal parts and portions of my model airplane rotating stand.

The base 1 of my model airplane rotating stand is a substantially box-like structure arranged in inverted position, wherein, the open side thereof, rests on the floor or any other suitable surface during operation. This base 1 is provided with a centrally disposed upwardly extending hollow cylindrical sleeve 1a in which the hollow shaft 2 is revolubly mounted as shown best in Fig. 1 of the drawing. This hollow shaft 2 is provided with a bore portion 2a therein, arranged to contain the shaft 3 which is freely and revolubly mounted, therein. Fixed on the shaft 3 is the ratchet wheel 11 engaged by the pawl 12 maintained in engagement with the ratchet wheel 11 by the spring 13, all as shown best in Figs. 1 and 2 of the drawings. The upper end of the shaft 2 is provided with a plate 2b on which the pawl 12 and spring 13 are mounted. Secured in connection with the lower end of the shaft 2 is the pinion gear 4 meshing with the gear 5 of considerably larger diameter. This gear 5 is secured to the shaft 16a of the operating handle 16 which projects through the top side 1b of the base 1. This shaft 16a is provided with an enlarged hub 16b bearing in the upper side portion 1b of the base 1 supporting the gear 5 together with the roller 6 in the base 1, all as shown best in Fig. 1 of the drawing. The roller 7 as shown in Fig. 3 of the drawings is fixed to the base 1 by means of the axle 9 which is secured at its upper end to the frame plate 1c below the upper side 1b of the base 1. The bolt 10 is also secured to the frame plate 1c and supports one end of the resilient band 8 which passes over the roller 7 and is secured at its opposite end in connection with the roller 6 as shown in Fig. 3 of the drawing. This resilient band 8 is an endless member looped over the bolt 10 at one folded end, thereof, and looped over a pin 6a extending through an arcuate recess 6b in the roller 6 inwardly of the drum surface 6c, thereof, all as shown best in Fig. 3 of the drawing. At the transition of the slotted portion 6d in the roller 6 communicating with the arcuate recess portion 6b in the drum surface 6c, the band 8 passes around the drum surface 6c on which it is wound. It will be here noted that the roller 7 is revolubly mounted on the axle 9 and that the operating handle 16 together with the shaft 16a secured to the gear 5 and roller 6 are all rigidly secured together. Secured to the normally upper end of the shaft 3 are the cross arms 14 having open loop portions 14a at their outer ends from which the links 15a are suspended for supporting the airplanes 15, all as shown best in Fig. 1 of the drawing.

The operation of my model airplane rotating stand is substantially as follows:

When the handle 16 is forced in the direction as indicated by the arrow A in Fig. 3 of the drawing, the roller 6 is rotated in connection with the shaft 16a secured to the handle 16 winding the resilient band 8 around the periphery of the roller 6 which is preliminarily stretched over the roller 7 creating tension in said resilient band before it is wound upon the roller 6. When the operating handle 16 is released, tension in the resilient band 8 tends to force the operating handle 16 together with the roller 6 in the opposite direction from the arrow A as indicated in Fig. 3 of the drawing, whereupon the gear 5 in mesh with the pinion 4 rotates the pinion 4 at a considerably greater speed causing rotation of the shaft 2 with which the pawl 12 is connected. This pawl 12 engages a tooth of the ratchet wheel 11 causing synchronous rotation of the shaft 3 relatively to the shaft 2. When the operating handle 16 comes to rest adjacent the sleeve 1a of the base 1, the shaft 3 continues to rotate due to inertia of the airplane 15 in connection with the links 15a whereby teeth of the ratchet wheel 11 pass the pawl 12 permitting the operator to again operate the handle 16 winding the resilient member 8 on the roller 6, whereupon the ratchet wheel 11 is again engaged by the pawl 12 for continued acceleration of the shaft 3 together with the cross arms 14 and airplane in connection therewith. It being noted that the teeth 11a are provided with inclined surfaces in one direction and positive abutment portions facing the opposite direction whereby the pawl 12 is engageable with the ratchet wheel 11 when operating in one direction only. If desired the operating handle 16 may be moved each time the resilient band 8 is unwound until the rotation of the shaft 3 is considerably accelerated due to the remaining speed of rotation after each complete unwinding movement of the operating handle 16 together with the roller 6.

Though I have shown and described a particular construction, combination and arrangement of parts and portions, I do not wish to be limited to this particular construction, combination and arrangement, but desire to include in the scope of my invention, the construction, combination and arrangement, substantially as set forth in the appended claims.

Having thus described my invention, what I claim as new and desire to secure by Letters Patent is:

1. In a device of the class described the combination of a frame, a resilient band stationarily secured at its one end to said frame, a roller revolubly mounted on said frame and having a peripheral surface and connected with the opposite end of said resilient band adapted to wind the same on said peripheral surface, thereon, an axle for said roller, an arm fixed on said axle, a gear in concentric connection with said roller, a pinion meshing with said gear, a shaft in connection with said pinion, a second shaft revolubly mounted concentrically with said first mentioned shaft and ratchet and pawl means in connection with said first and second mentioned shafts for imparting rotation to said second mentioned shaft when said first mentioned shaft rotates.

2. In a device of the class described the combination of a frame, a resilient band stationarily secured at its one end to said frame, a roller revolubly mounted on said frame and having a peripheral surface and connected with the opposite end of said resilient band adapted to wind the same on said peripheral surface, thereon, an axle for said roller, an arm fixed on said axle, a gear in concentric connection with said roller, a pinion meshing with said gear, a shaft in connection with said pinion, a second shaft revolubly mounted concentrically with said first mentioned shaft and ratchet and pawl means connected to said first and second mentioned shafts for imparting rotation to said second mentioned shaft when said first mentioned shaft rotates, a second roller spaced from said first mentioned roller over which said resilient band extends intermediate its ends.

3. In a device of the class described the combination of a frame, a resilient band stationarily secured at its one end to said frame, a roller revolubly mounted on said frame and having a peripheral surface and connected with the opposite end of said resilient band adapted to wind the same on said peripheral surface, thereon, an axle for said roller, an arm fixed on said axle, a gear in concentric connection with said roller, a pinion meshing with said gear, a shaft in connection with said pinion, a second shaft revolubly mounted concentrically with said first mentioned shaft and ratchet and pawl means at the end of said first-mentioned shaft and connected to said first and second mentioned shafts for imparting rotation to said second mentioned shaft when said first mentioned shaft rotates, a second roller spaced from said first mentioned roller over which said resilient band extends intermediate its ends.

4. In a device of the class described the combination of a frame, a bearing on said frame, a shaft revolubly mounted in said bearing, a pinion on said shaft, a gear considerably larger in diameter than said pinion in mesh therewith, a shaft for said gear, an arm fixed on said shaft on which said gear is fixed, a roller having an outer arcuate surface connected concentrically to said gear, a resilient band connected with the outer arcuate surface of said roller at its one end and connected at its opposite end to said frame.

5. In a device of the class described the combination of a frame, a bearing on said frame, a shaft revolubly mounted in said bearing, a pinion on said shaft, a gear considerably larger in diameter than said pinion in mesh therewith, a shaft for said gear, an arm fixed on said shaft on which said gear is fixed, a roller having an outer arcuate surface connected concentrically to said gear, a resilient band connected with the outer arcuate surface of said roller at its one end and connected at its opposite end to said frame, a stationarily and revolubly mounted roller on said frame engaging said resilient band intermediate its ends.

6. In a device of the class described the combination of a frame, a bearing on said frame, a shaft revolubly mounted in said bearing, a pinion on said shaft, a gear considerably larger in diameter than said pinion in mesh therewith, a shaft for said gear, an arm fixed on said shaft on which said gear is fixed, a roller having an outer arcuate surface connected concentrically to said gear, a resilient band connected with the outer arcuate surface of said roller at its one end and connected at its opposite end to said frame, a stationarily and revolubly mounted roller on said frame engaging said resilient band intermediate its ends, said second mentioned roller substantially smaller in diameter than said first mentioned roller, a third shaft revolubly mounted on said frame concentric with said first mentioned shaft and ratchet and pawl means operatively connecting said third shaft and said first shaft when said first shaft rotates in one direction.

ARVIN A. GUSSA.

REFERENCES CITED

The following references are of record in the file of this patent:

UNITED STATES PATENTS

| Number | Name | Date |
|---|---|---|
| 200,714 | Groth | Feb. 26, 1878 |
| 212,926 | Groth | Mar. 4, 1879 |
| 609,050 | Rudensky | Aug. 16, 1898 |
| 662,007 | MacPherson | Nov. 20, 1900 |
| 1,272,195 | Black | July 9, 1918 |
| 1,379,486 | Svec | May 24, 1921 |
| 1,652,137 | Arden | Dec. 6, 1927 |
| 1,659,810 | Damoff | Feb. 21, 1928 |
| 2,222,648 | Biller | Nov. 26, 1940 |